United States Patent
Szucs et al.

(10) Patent No.: US 7,617,514 B2
(45) Date of Patent: Nov. 10, 2009

(54) NETWORK FUNCTIONALITY FOR MULTIMEDIA HOME PLATFORM TERMINAL DEVICES

(75) Inventors: Paul Szucs, Ostfildern (DE); Stephen Tiedemann, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 971 days.

(21) Appl. No.: 10/625,712

(22) Filed: Jul. 23, 2003

(65) Prior Publication Data

US 2005/0210513 A1 Sep. 22, 2005

(30) Foreign Application Priority Data

Jul. 25, 2002 (EP) .................. 02016673

(51) Int. Cl.
 *H04Q 9/00* (2006.01)
 *H04W 48/20* (2006.01)
 *H04W 88/12* (2006.01)

(52) U.S. Cl. ................... 725/85; 725/80; 715/737

(58) Field of Classification Search .............. 725/59, 725/74, 78, 80, 82, 85, 139, 141, 52; 715/734, 715/737; 726/19; 348/E5.006, E5.105, E5.108; 307/38

See application file for complete search history.

(56) References Cited

U.S. PATENT DOCUMENTS

| | | | | |
|---|---|---|---|---|
| 6,813,692 | B2* | 11/2004 | Morris et al. | 348/E5.006 |
| 7,140,033 | B1* | 11/2006 | Durden et al. | 725/139 |
| 7,200,683 | B1* | 4/2007 | Wang et al. | 725/141 |
| 2001/0018767 | A1* | 8/2001 | Heughebaert et al. | 725/52 |
| 2001/0038392 | A1 | 11/2001 | Humpleman et al. | |
| 2002/0047860 | A1* | 4/2002 | Ceulaer et al. | 348/E5.105 |
| 2002/0059645 | A1* | 5/2002 | Soepenberg et al. | 348/E5.108 |
| 2002/0120932 | A1 | 8/2002 | Schwalb | |
| 2002/0194596 | A1* | 12/2002 | Srivastava | 725/139 |
| 2003/0009760 | A1* | 1/2003 | Sakamoto et al. | 725/74 |
| 2003/0046592 | A1* | 3/2003 | Woodruff | 726/19 |
| 2003/0075983 | A1* | 4/2003 | Stecyk et al. | 307/38 |

FOREIGN PATENT DOCUMENTS

WO WO 01/89224 11/2001

OTHER PUBLICATIONS

ETSI TS 101 812 V1.1.1 (Jul. 2000) Digital Video Braodcasting (DVB); Multimedia Home Platform (MHP) Specification 1.0 pp. 1-20, 33, 49, 51, 168 and 469.*
"Digital Video Broadcasting (DVB); Multimedia Home Platform (MHP) Specification 1.0", Jul. 2000, ETSI, Sophia Antipolis XP002224936.
A Smith-Chaigneau: "Multimedia Home Platform" ETSI TS 101 812 V1.1.1, 'Online! Nov. 2001, pp. 1-12, XP002224935.

* cited by examiner

*Primary Examiner*—Andrew Y Koenig
*Assistant Examiner*—Jasmine Stokely-Collins
(74) *Attorney, Agent, or Firm*—Oblon, Spivak, McClelland, Maier & Neustadt, L.L.P.

(57) ABSTRACT

A MHP terminal device is provided with a network functionality. In addition to a broadcast interface for receiving a broadcast transport stream, the MHP terminal device comprises a local network interface. Via said interface, the MHP terminal device is connected to a local network, to which other network devices are connected as well. MHP applications can be inserted into local network transport streams transmitted from said network devices to said MHP terminal device. By means of these MHP applications, the network devices can be remotely controlled from the MHP terminal device, whereby commands and messages are exchanged via the local network.

27 Claims, 4 Drawing Sheets

NETWORK FUNCTIONALITY FOR MULTIMEDIA HOME PLATFORM TERMINAL DEVICES

The invention is related to an MHP terminal device, a network device, a local network comprising a MHP terminal device and at least one network device. Furthermore, the invention is related to a method for controlling a network device.

The DVB Multimedia Home Platform (MHP) is a standard that allows to expand the functionality of a TV set by enabling user interaction at the TV. MHP software applications can be downloaded and launched on part of the TV set in order to provide an enhanced TV functionality. Via a graphical user interface, a user can interact with the TV set and make selections in a menu-driven dialogue displayed on the screen. Examples are applications that require some kind of user input or user interaction, such as gaming, online auctions, shopping, etc. The broadcast MHP applications are often associated with a particular service, event, or its provider or associated party.

According to the MHP standard, the TV receiver loads said MHP software applications from the broadcast stream. The MHP terminal device receives a transport stream from the broadcast interface (satellite, cable, terrestrial, etc.). It detects that MHP applications are present and can load and launch such applications.

The standard MHP defines how application executable code is packed into the MPEG-2 transport stream. Security, maintenance of integrity of downloaded software modules, and life-cycle management are other issues that are addressed by MHP. Furthermore, MHP provides graphics resources that can be used by the respective MHP applications in order to generate a graphical user interface (GUI), which can be accessed by the user in order to access the functionality offered by the respective MHP application. Details concerning the MHP standard can be found in ETSI TS 101 812, V1.1.1, 2000-07, Digital Video Broadcasting (DVB); Multimedia Home Platform Specification V1.0.

In the known environment for MHP, the broadcaster inserts MHP applications at the point of distribution of the broadcast stream. Broadcast equipment exists, which allows to prepare DSM-CC Object Carousels for input to a broadcast multiplexer. MHP applications carried in said Object Carousels are inserted at the broadcast source at the same time that the AV content is multiplexed.

So far, the only possible way for distributing MHP applications is to insert said MHP applications into the broadcast data stream.

It is an object of the invention to provide a MHP terminal device, a network device, a local network and a method for controlling a network device that allow to introduce local network functionality to an MHP-centric architecture.

The object of the invention is solved by a MHP terminal device according to claim 1, by a network device according to claim 15, by a local network according to claim 22, and by a method for controlling a network device according to claim 23. Preferred embodiments thereof are respectively defined in the following dependent sub-claims. A computer program product according to the present invention is defined in claim 28 and a computer readable storage medium is defined in claim 29.

According to the invention, a MHP terminal device comprises a broadcast interface for receiving a broadcast transport stream. Broadcast MHP applications to be launched at said MHP terminal device are transmitted within said broadcast transport stream and are received via said broadcast interface. The MHP terminal device further comprises a local network interface for connecting said MHP terminal device to a local network, and for receiving local network transport streams emanating from other network devices connected to said local network. Local network MHP applications to be launched at said MHP terminal device are transmitted within said local network transport streams and are received via said local network interface.

According to the invention, the MHP terminal device is supplied with a local network interface for connecting said MHP terminal device to a local network. Thus, the MHP terminal device is provided with a networking functionality. Via said local network interface, data can be exchanged with other network devices. In particular, it is possible to receive and send transport streams from and to other network devices. So far, the MHP terminal device has only been able to receive data streams via the broadcast interface.

Said data streams can be AV streams (movies, music files) that are supplied by a AV server in the local network. Said data streams can comprise service information, e.g. subtitle streams. According to the invention, local network MHP applications are received at the MHP terminal device, whereby said MHP applications are transmitted within data streams emanating from a network device. By means of the local network, it is possible to exchange MHP applications between the network devices and the MHP terminal device. These MHP applications are downloaded and launched at the MHP terminal device. So far, it has only been possible to receive MHP applications. Now, by means of the local network interface, it is possible to receive MHP applications via the local network, which can be seen as a "second source" for MHP applications.

Furthermore, the local network can be used for the transmission of messages and commands between the MHP terminal device and the network devices. This allows to remotely control and/or to remotely access said network devices from the MHP terminal device. For example, a command "start recording" can be sent from the MHP terminal device via the local network to a DVD recorder that is connected to the local network.

The network functionality can therefore be used for downloading MHP applications and for remotely controlling and/or accessing network devices connected to the local network. It is advantageous to combine these two aspects. According to the invention, a network device, e.g. a DVD recorder, transmits a MHP application to the MHP terminal device that contains all the functionality required for remotely controlling said DVD recorder. The respective MHP application is received and launched at the MHP terminal device. Via a graphical user interface at the MHP terminal device, a user can remotely access the DVD recorder from the MHP terminal device. Commands like "start recording" are input to the MHP terminal device. These commands are then transmitted from the MHP terminal device via the local network to the network device. There, the respective command is executed.

The advantage of this solution is that each network device can carry its own dedicated MHP application. The network device can provide a MHP application that corresponds exactly to the functionality of the network device. The user doesn't have to select between different versions of a MHP application, he or she is automatically supplied with the required MHP application.

According to a preferred embodiment of the invention, said local network transport stream comprises at least one of AV data, program specific information, MHP application byte code, service information, and particularly, said local network transport stream is a data stream according to the MPEG-2 standard. Therefore, it is possible to transmit said MHP applications together with AV streams, subtitle streams, etc. on said local network. The local network can be used as an all-purpose network for connecting the TV set with DVD recorders, AV content servers, etc.

Preferably, the MHP terminal device comprises a resident application that monitors both said broadcast interface and said local network interface in order to detect MHP applications transmitted within said broadcast transport stream or within said local network transport stream, and that initiates a loading of said MHP applications. In prior art MHP terminal devices, there has been a resident application for monitoring the broadcast transport stream in order to detect MHP applications. According to the invention, the MHP terminal device is additionally provided with a local network transport stream. Now, two instead of one transport stream have to be monitored. The same resident application can be used for this task. Implementing the invention does therefore only require to install a small extension to the existing MHP layer within the MHP terminal device.

Further preferably, the MHP terminal device comprises an application manager running on said MHP terminal device that is responsible for download, maintenance, and life-cycle management of both said broadcast MHP applications and said local network MHP applications. The resident application initiates a download when a MHP application is detected. The download is carried out by the application manager.

Preferably, said application manager maintains an application database in which each downloaded MHP application is registered. At the MHP terminal device, the available MHP applications (both the broadcast MHP applications and the local network MHP applications) are registered. The user is informed, preferably by means of a graphical user interface, about the MHP applications that are available.

Preferably, at said MHP terminal device, the received MHP application byte code of said local network MHP applications is passed to a MHP layer, whereby a underlying transport protocol used on said local network is hidden from said MHP layer. As far as the transmission of the MHP application byte code from the network device to the MHP terminal device is concerned, all that matters is that the respective protocol used on the local network provides the payload necessary for transmitting the byte code of the MHP application. The MHP application byte code is passed to the MHP layer. The protocol used on the local network is therefore transparent for the MHP architecture. The MHP layer can cooperate with any local network protocol one can think of. The inventive concept does not depend on the use of a specific protocol. This implies that any local network can be used for the inventive concept of exchanging MHP applications via a local network. Furthermore, any network can be used for remotely accessing and controlling a device network connected to said local network. The power of the approach of the invention is that a MHP network functionality is provided that can be used with any available local network protocol.

Further preferably, said local network is a IEEE 1394 network, a wireless LAN, a wired LAN, a wired or wireless IP network, or any other kind of local network. IEEE 1394 and the packet-based Internet Protocol (IP) are the two most common networking standards for the transmission of AV data. A IEEE 1394 network is particularly suited to the transmission of live AV data.

Further preferably, on said local network, any kind of middleware such as HAVi, UPnP, AV/C is used for exchanging messages and/or commands. In a local network, the so-called middleware is responsible for routing data streams and managing the available bandwidth. While HAVi and UPnP provide an advanced functionality, AV/C is a pure device control standard. The respective middleware has to be installed at all the devices connected to a local network. For implementing the invention, any kind of middleware can be used.

According to a preferred embodiment of the invention, said MHP terminal device comprises graphical user interface resources, display means, and user input means that enable a user to interact with said local network MHP applications and with said broadcast MHP applications. The TV set is equipped in a way that an interactive dialogue with the user becomes possible. The user can forward his input to the various MHP applications that have been launched on the part of said MHP terminal device. Especially for remotely controlling network devices that are connected to a local network, the user has to be able to forward his input to the respective MHP application, which can either be a broadcast MHP application or a local network MHP application. Said user input is then transformed into the commands required for remotely controlling said network devices.

Preferably, said local network MHP applications use graphical user interface resources at said MHP terminal device for providing a graphical user interface that enables a user to interact with said local network MHP applications. The MHP applications can access these graphical user interface resources at the MHP terminal device. The amount of MHP application byte code necessary for implementing a comfortable graphical user interface is thereby considerably reduced.

Further preferably, at said MHP terminal device, a graphical user interface is updated in order to show the availability of said local network MHP applications and/or of said other network devices.

According to a preferred embodiment of the invention, said local network MHP application is an application for remotely accessing and/or controlling the respective network device from which said local network MHP application has been received. The MHP terminal device is the user's central access point for accessing the network devices and for using the functionalities of various MHP applications. By means of the MHP applications supplied by the network devices that are connected to the local network, the user can access and control all these devices. The user can be sure that the MHP application and the network device that has supplied the MHP application fit together, and that it is possible to access all the functions of the network device by accessing the MHP application.

Preferably, remote access and remote control are effected by transmitting commands from the MHP terminal via the local network to the respective network device. The local network is therefore used for two different purposes, for the transmission of the MHP application from the network device to the MHP terminal device, and for the exchange of messages and commands between the MHP terminal device and the network device.

The network device according to the invention comprises storage means for storing local network MHP applications, or a means to generate such MHP applications, that are to be transmitted to a MHP terminal device. Furthermore, the network device comprises a local network interface for connecting said network device to a local network, and for transmitting a local network transport stream to said MHP terminal device. Local network MHP applications to be launched at said MHP terminal device are transmitted within said local network transport streams. The network device further comprises multiplexing means for multiplexing said local network MHP application into said local network transport stream.

Within the storage means of the network device, a MHP application is stored that is intended to be used for remotely accessing and controlling the network device from a MHP terminal device. The MHP application can be transmitted via a local network to the MHP terminal device, which is also connected to the local network. There, the MHP application is started, and the user can access the functionality of the network device by interacting with said MHP application. Any commands provided by the user are transmitted to the network device, in order to remotely control said network device.

By storing the respective MHP application within the network device itself, a one to one correspondence between the network device and the MHP application for remotely controlling said network device can be established. All the functions provided by the network device can be accessed by the corresponding MHP application. The user doesn't have to care about the type of the network device and about different versions of the MHP application, he or she is automatically supplied with the right MHP application.

According to a preferred embodiment of the invention, the network device comprises an object carousel generator for segmenting said local network MHP applications into a set of data packets, and for repeatedly transmitting said set of data packets. The byte code of said local network MHP applications is segmented into a set of data packets. The object carousel inserts these data packets into the local network transport stream. When all the data packets corresponding to said local network MHP applications have been transmitted, the transmission is repeated. Thus, it doesn't matter when the MHP terminal device detects that an MHP application is transmitted. Said MHP terminal device just has to wait until the current transmission is finished. Then, in the subsequent transmission, all the data packets belonging to the MHP application can be received from the start to the end.

An example of the practical application of the network device is for an authentication device, such as a NCAM (Network Conditional Access Module), connected via the local network to the MHP terminal device. The respective smart card reader or chip card reader can be built into the housing of the NCAM. In order to use Pay TV or Video on Demand services, the user can insert a corresponding authentication device into the respective reader. Via the local network, the NCAM is connected to the MHP terminal device.

Further preferably, said network device either is a NCAM, an AV content server, a transcoder, a DVB recorder, a home automation server, or any other kind of network device. The different functionalities of these devices can be presented graphically to the user, and the user can access and program these devices from his TV set.

A local network according to the invention comprises a MHP terminal device as described above, and at least one network device as described above.

The inventive method is for controlling a network device by means of a MHP terminal device, whereby the network device is connected to a local network, and whereby the MHP terminal device is connected to the same local network. As a first step, a local network MHP application is transmitted, together with a local network transport stream, from said network device to said MHP terminal device. Next, said local network MHP application is launched at said MHP terminal device. Then, commands and/or messages are transmitted via said local network to said network device in order to remotely access and/or control said network device.

Further features and advantages of preferred embodiments according to the present invention will be explained below in conjunction with the accompanying drawings, in which FIG. 1 shows a MHP terminal device that is connected, via a local network, to another network device;

Figure 1:
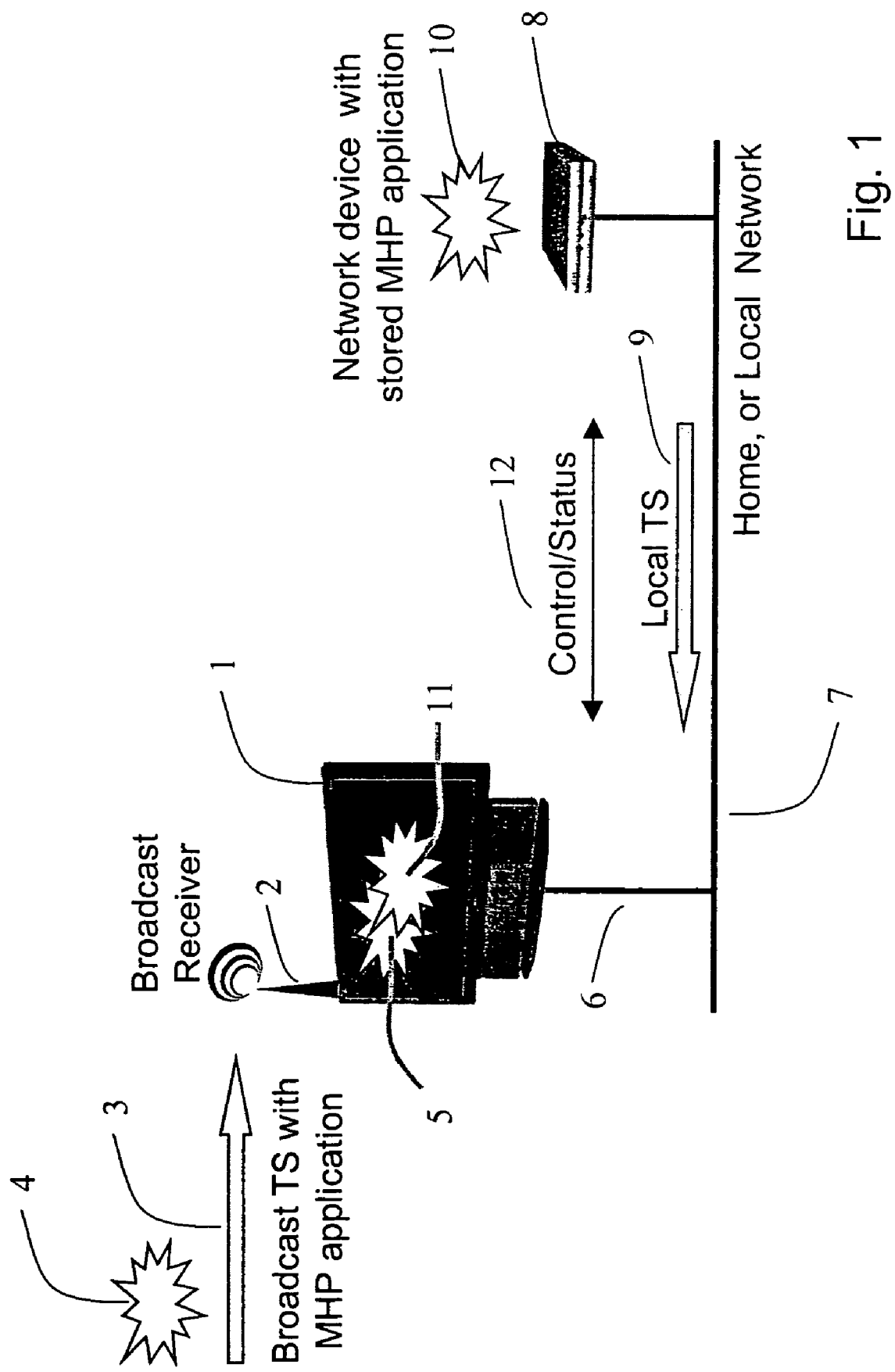

In FIG. 1, a MHP (Multimedia Home Network) terminal device 1 comprising a broadcast receiver 2 is shown. The MHP terminal device might be a TV set, e.g. an IDTV set. The broadcast receiver 2 could either be a satellite receiver, a terrestrial receiver, or a cable receiver. On part of the broadcast receiver 2, a broadcast transport stream 3 is received. Preferably, said broadcast transport stream 3 is a data stream according to the standard MPEG-2 and may include one or more AV data streams, program information data and/or additional data, e.g. service information. The standard MPEG-2 has been defined by the Motion Picture Expert Group. Details concerning the standard MPEG-2 can be found in ISO/IEC 13818-1, 1996-04-15, Information technology—Generic coding of moving pictures and associated audio information: Systems, "MPEG-2 Systems".

The standard MHP defines a method of packing application executable code into the MPEG-2 transport stream. On part of the transmitter, a MHP application is inserted into the broadcast transport stream 3. The MHP application 4 is transmitted within the broadcast transport stream 3 to the MHP terminal device 1. On part of the MHP terminal device 1, a resident application monitors the transport stream 3 received via the terminal device's broadcast interface. Broadcast MHP applications are identified, loaded and launched within the MHP terminal device.

In FIG. 1, a broadcast MHP application 5 that has been launched within the MHP terminal device 1 is depicted. The purpose of MHP applications is to provide an enhanced TV experience by enabling user interaction with the TV. A MHP application usually provides a graphical user interface (GUI) as well as user interface resources in order to allow for an interactive dialogue with the user. The MHP standard includes definitions for said user interface resources. Besides that, issues such as security features, maintenance of integrity and life-cycle management of the downloaded MHP applications are addressed by the MHP standard.

According to the invention, the MHP terminal device 1 is connected, by means of a local network interface 6, to a local network 7. Another network device 8 is also connected to said local network 7, and besides that, it is possible to connect further network devices to said local network 7. Emanating from said network device 8, a local network transport stream 9 is transmitted to the local network interface 6 of the MHP terminal 1 via the local network 7. According to the invention, MHP applications 10 which are stored on part of the network device 8 are transmitted within the local network transport stream 9 to the MHP terminal device 1. The network device 8 is capable of inserting said MHP applications 10 into the local network transport stream 9. On part of the terminal device 1, said MHP applications 10 are recognized and loaded from the local network transport stream 9. The received MHP applications 10 are either launched immediately, or they are launched when the user requests it. In FIG. 1, a MHP application 11 that has been launched on part of the MHP terminal device 1 is shown. Preferably, the local network transport stream 9 is a transport stream according to the MPEG-2 specification. Besides the byte code of said MHP applications 10, the local network transport stream 9 might comprise one or more AV data streams, program information data and/or additional data, e.g. service information.

The network device 8 could e.g. be a NCAM (Network Conditional Access Module). A NCAM comprises a card reader or another kind of authentication unit, whereby a user can identify himself by inserting a chip card, smart card, magnetic card or another kind of identification means into said NCAM. In case the user's authentication is successful, he or she can access certain programs, TV stations, movies, etc. that are offered per Pay TV or per Video on Demand, and that require extra payment.

In case the network device 8 is a NCAM, said NCAM might comprise a stored MHP application that is transmitted to and launched at the MHP terminal device 1. Said MHP application enables a user to access the NCAM's functionality from the MHP terminal device 1, and to control the NCAM from the MHP terminal device 1. A graphical user interface (GUI) and resources for interactively accessing said NCAM are part of the MHP application. For example, when said MHP application is run on part of the MHP terminal device 1, the movies, programs etc. that can be viewed when accessing Pay TV or Video on Demand might be shown on the display of the MHP terminal device 1 in a way that the user can make his choice.

Besides the local network transport stream 9, control and status messages 12 can be exchanged between the MHP terminal device 1 and the network device 8. On part of the MHP terminal device 1, a user input may cause a command to be transmitted via the local network 7 to said network device 8, in order to remotely control the network device 8 according to the respective user input.

On part of the network device 8, a status message may be generated, and said status message is transmitted via the local network 7 to the MHP terminal device 1. There, the respective status of the network device 8 is displayed on the graphical user interface of the launched MHP application 11. For example, a status message indicating that the user's authentication has been successful might be transmitted from the NCAM via the local network 7 to the MHP terminal device 1. There, the MHP application that is responsible for controlling the NCAM indicates to the user that his authentication has been successful.

The network device 8 could also be an AV content server. In this case, AV content is transmitted via the local network transport stream 9 to the MHP terminal device 1, where the user can select and view various contents. The AV content server comprises storage means for storing MHP applications. According to the invention, the AV content server inserts said MHP applications into the local network transport stream 9, in order to transmit one or more MHP applications to the MHP terminal device 1. On part of the MHP terminal device 1, these MHP applications are received and launched. Thus, the AV content server can provide the MHP terminal device 1 with a control functionality that allows to control said AV content server via the local network 7.

The network device 8 could be a home automation server. Various devices in a home, such as heaters, air conditioning, lighting, blinds may be controlled by means of a home automation server. According to the invention, the automation network server is connected to the local network 7 and transmits a suitable MHP application for controlling the various home devices to the MHP terminal device 1. Preferably, the MHP application comprises a GUI that indicates the status of the various home devices, and accepts user input. The MHP application is inserted into the local transmission stream 9 and transmitted to the MHP terminal device 1. There, the application is started, in order to allow for a remote control of the heaters, lights, fans, etc. that are connected to the home automation server.

The network device 8 could be a DVB (Digital Video Broadcasting) recorder which transmits MHP applications, via the local network transport stream 9, to the MHP terminal device 1. Said MHP applications are launched on part of the MHP terminal device 1 and provide a GUI to the user that allows to control the DVB recorder by interacting with the MHP terminal device 1. User commands such as "start recording a certain AV stream" or "stop recording" are forwarded to the DVB recorder via the local network 7.

The local network 7 can be a network according to any of the current networking standards used for the transmission of audio/video streams. For example, the local network 7 can be a network according to the IEEE 1394 standard. The IEEE 1394 standard allows for high bit rates and is therefore well-suited for the transmission of video data. Alternatively, the local network 7 can be realized as a—wired or wireless—IP (Internet Protocol) network with a packet-based data transmission. Any other networking technology such as wireless LAN, Bluetooth etc. could be used as well.

In order to implement the invention, all that matters is that the respective networking technology used on the local network 7 provides the data transmission payload for transmitting the MHP application 10 from the network device 8 via the local network 7 to the MHP terminal device 1. On part of the MHP terminal device 1, the byte code received at the local network interface 2 is further processed by the MHP layer of the MHP terminal device 1.

On the local network 7, any middleware protocol, e.g. HAVi, UPnP, AV/C can be employed. The middleware is responsible for routing data streams between the devices connected to the local network, and for managing the data payloads. For the inventive concept, it is of no importance which middleware standard is used on the local network.

Figure 2:
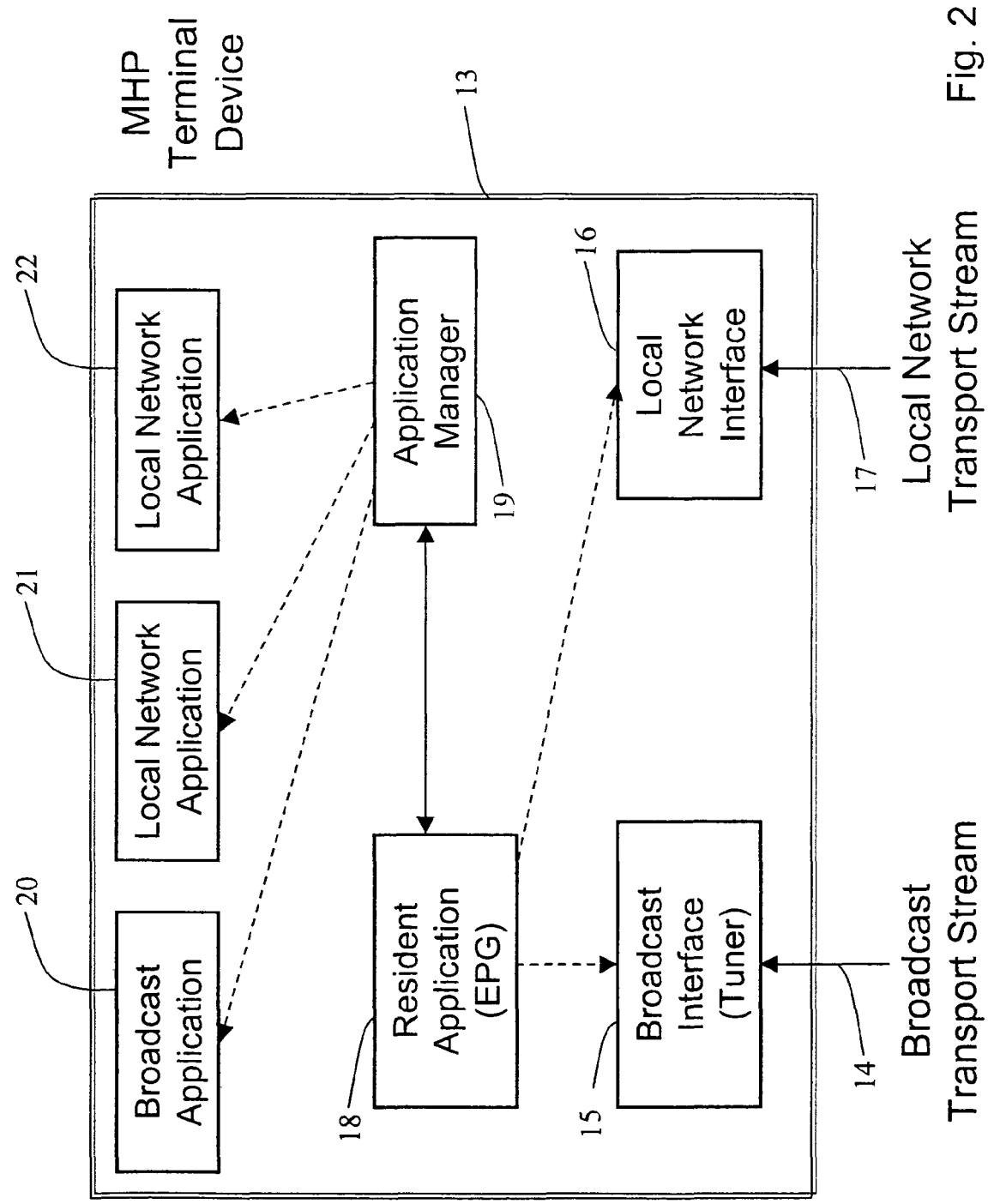
FIG. 2 shows a block diagram of the MHP terminal device according to the invention.

In FIG. 2, a block diagram of the MHP terminal device according to the invention is shown. At the MHP terminal device 13, a broadcast transport stream 14 is received by a broadcast interface 15, which is e.g. a tuner. Via the local network interface 16, the MHP terminal device 13 is connected to a local network. A local network transport stream 17 is received via said local network interface 16.

MHP applications can be transmitted to said MHP terminal device 13 within the broadcast transport stream 14 or within the local network transport stream 17. Both inbound transport streams are monitored by a resident application 18, in order to detect MHP applications transmitted within these transport streams. The resident application 18 could e.g. be an Electronic Program Guide (EPG) which keeps track of the various programs received within the transport streams and indicates to the user which programs are available.

In case the resident application 18 detects that a MHP application is transmitted within the local network transport stream 17, a download of said MHP application is initiated. The download is carried out by the application manager 19, which is responsible for download, maintenance, and life-cycle management of both said broadcast MHP applications and said local network MHP applications. The application manager 19 keeps track of which MHP applications have been downloaded. Some of the downloaded MHP applications are launched immediately after the download is completed, while other MHP applications are started when the user requests it. The application manager 19 maintains an application database in which each of the downloaded MHP application is registered. In the example given in FIG. 2, the application database would contain entries for the broadcast application 20 and for the local network applications 21, 22.

Figure 3:
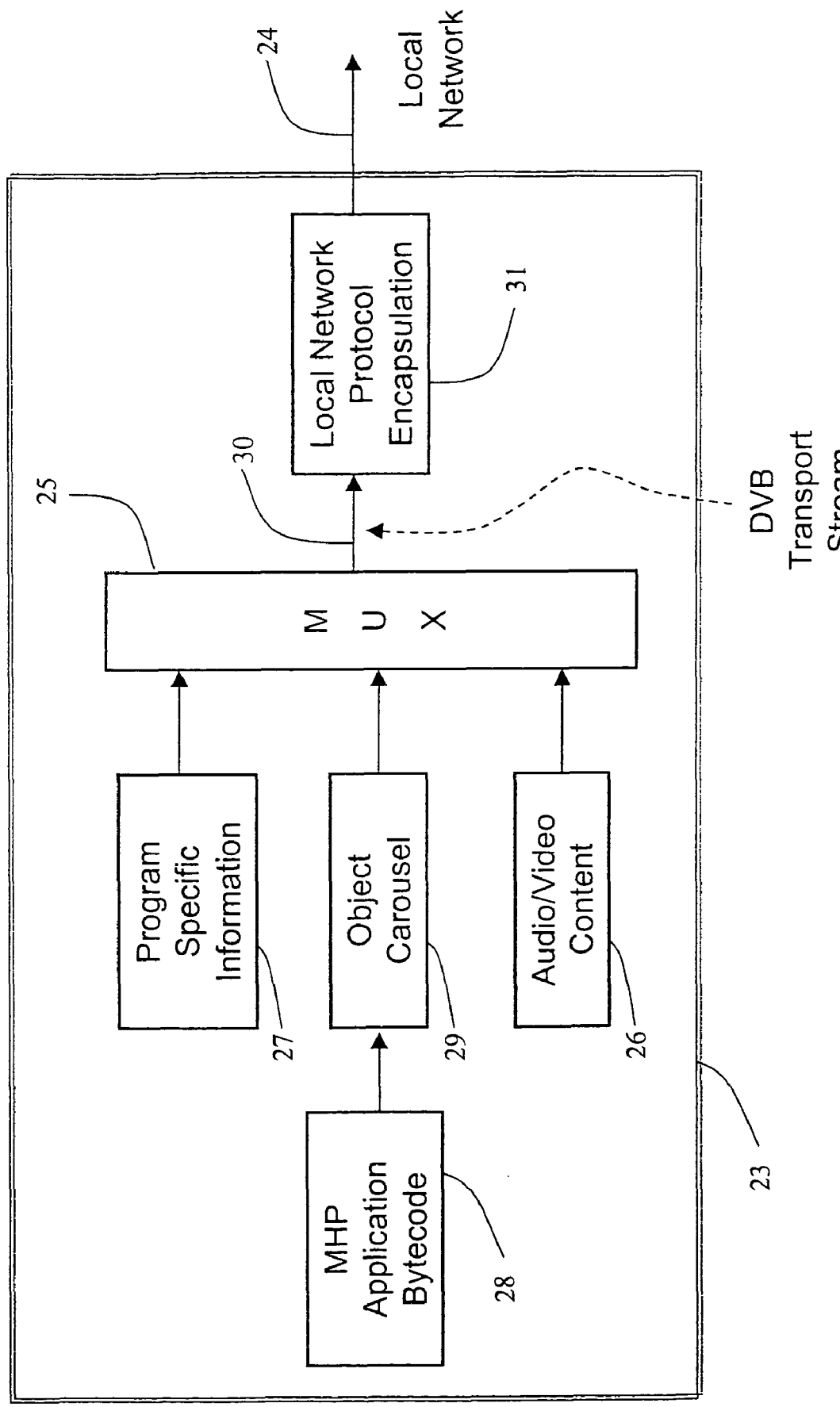
FIG. 3 shows a block diagram of a network device according to the invention.

In FIG. 3, a block diagram of a network device is given. The network device 23 provides a local network transport stream 24 to the local network. Preferably, said local network transport stream 24 is a transport stream according to the MPEG-2 specification. In order to combine different data streams emanating from different data sources into one transport stream, the network device comprises a multiplexer 25. To said multiplexer 25, an AV data stream 26 is provided. Additionally, a data stream 27 containing Program Specific Information (PSI) according to the standard MPEG-2 is forwarded to the multiplexer 25. In particular, the Application Information Table (AIT) is inserted, in order to signal the presence of the network device MHP application in the transport stream. In order to insert the MHP application byte code 28 into the transport stream, said MHP application byte code 28 is forwarded to the object carousel 29. There, the MHP application byte code 28 is segmented into a set of data packets. The data packets are forwarded to the multiplexer 25, and said multiplexer 25 inserts the data packets into the data stream. When the set of data packets containing the MHP application byte code 28 has been completely transmitted, the object carousel 29 starts a consecutive second transmission of said data packets. Thus, the MHP application byte code 28 is repeatedly transmitted, as it is indicated by the name "object carousel". At the output of the multiplexer 25, a DVB (Digital Video Broadcasting) data stream 30 is obtained, which is forwarded to the local network protocol encapsulation unit 31. There, the DVB data stream 30 is converted into a local network transport stream 24, which is a transport stream according to the network protocol of the local network. Said local network transport stream 24 is transmitted via the local network.

Figure 4:
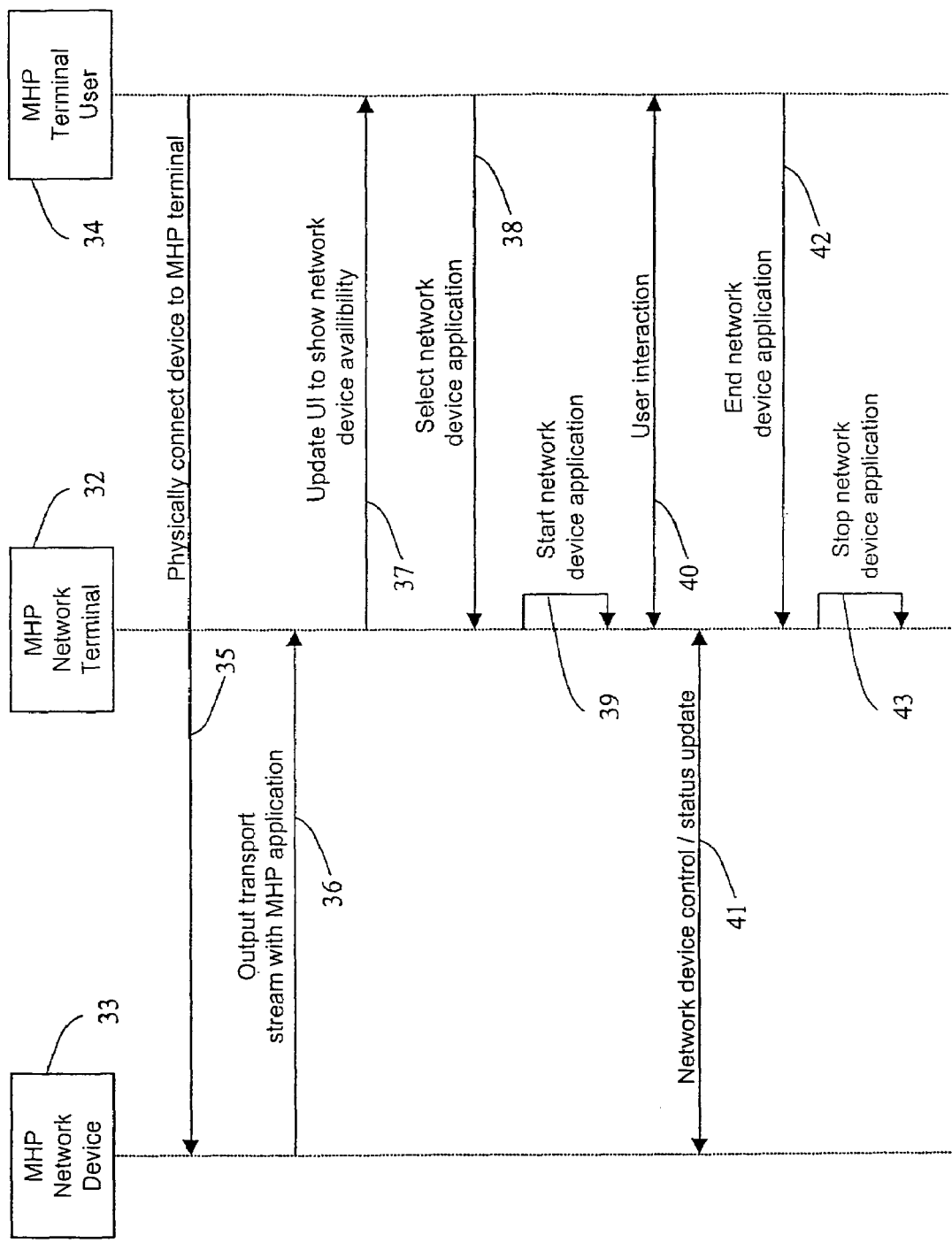
FIG. 4 shows the interaction between the MHP network terminal, the MHP network terminal user and a MHP network device.

In FIG. 4, the interaction between a MHP network terminal 32, a MHP network device 33 and the MHP terminal user 34 is shown. First, the MHP terminal user 34 establishes (35) a physical connection between the MHP network device 33 and the MHP network terminal 32. In step 36, the MHP network device 33 sends an output transport stream with a MHP application to the MHP network terminal 32. In step 37, the MHP network terminal 32 updates its User Interface (UI) to show the availability of the MHP network device 33. The MHP terminal user 34 can now select a MHP application (step 38). In step 39, the selected MHP application is started. The MHP terminal user 34 can now interact (step 40) with the MHP network terminal 32. According to the requests of the MHP terminal user 34, commands and control messages are forwarded to the MHP network device 33, and said MHP network device 33 sends messages indicating its status to the MHP network terminal 32. This is shown in step 41 in FIG. 4. In step 42, the MHP terminal user 34 indicates that the MHP application shall be terminated. Accordingly, in step 43, the MHP application is stopped.

The invention claimed is:

1. A MHP terminal device comprising:
   a broadcast interface configured to receive a broadcast transport stream, wherein broadcast MHP applications to be launched at said MHP terminal device are transmitted within said broadcast transport stream and are received via said broadcast interface, wherein said MHP broadcast applications are configured to be identified, loaded and launched within said MHP terminal device;
   a local network interface configured to connect said MHP terminal device to a local network, and for receiving local network transport streams emanating from object carousel generators in other network devices connected to said local network so that local network MHP applications providing user interface resources according to a MHP standard to be launched at said MHP terminal device are transmitted within said local network transport streams and are received via said local network interface; and
   wherein said object carousel generators are configured to segment said local network MHP applications into a set of data packets, and to repeatedly transmit said set of data packets.

2. The MHP terminal device according to claim 1, wherein said local network transport stream comprises at least one of AV data, program specific information, MHP application byte code, service information, and particularly, said local network transport stream is a data stream according to the MPEG-2 standard.

3. The MHP terminal device according to claim 1, further comprising:
   an application manager configured to run on said MHP terminal device that is responsible for download, maintenance, and life-cycle management of both said broadcast MHP applications and said local network MHP applications.

4. The MHP terminal device according to claim 3, wherein said application manager maintains an application database in which each downloaded MHP application is registered.

5. The MHP terminal device according to claim 1, wherein at said MHP terminal device, a received MHP application byte code of said local network MHP applications is passed to a MHP layer, whereby an underlying transport protocol used on said local network is hidden from said MHP layer.

6. The MHP terminal device according to claim 1, wherein said local network is an IEEE 1394 network, a wireless LAN, a wired LAN, a wired or wireless IP network, or other local network.

7. The MHP terminal device according to claim 1, wherein on said local network, of middleware is used for exchanging messages and/or commands.

8. The MHP terminal device according to claim 1, wherein said MHP terminal device comprises graphical user interface resources, display devices, and user input devices that enable a user to interact with said local network MHP applications and with said broadcast MHP applications.

9. The MHP terminal device according to claim 1, by further comprising:
   a resident application configured to monitor both said broadcast interface and said local network interface in order to detect MHP applications transmitted within said broadcast transport stream or within said local network transport stream, and that initiates a loading of said MHP applications.

10. The MHP terminal device according to claim 1, wherein said local network MHP applications use graphical user interface resources at said MHP terminal device for providing a graphical user interface that enables a user to interact with said local network MHP applications.

11. The MHP terminal device according to claim 1, wherein at said MHP terminal device, a graphical user interface is updated in order to show the availability of said local network MHP applications and/or of said other network devices.

12. The MHP terminal device according to claim 1, wherein said local network MHP application is an application for remotely accessing and/or controlling the respective network device from which said local network MHP application has been received.

13. The MHP terminal device according to claim 12, wherein remote access and remote control are effected by transmitting commands from the MHP terminal via the local network to the respective network device.

14. The MHP terminal device according to claim 1, wherein said other network devices comprise at least one of a NCAM, an AV content server, a transcoder, a DVB recorder, a home automation server, or other network device.

15. A local network, comprising:
a MHP terminal device according to claim 1; and
at least one network device including:
a storage device configured to store local network MHP applications providing user interface resources according to the MHP standard, or a device to generate such MHP applications, that are to be transmitted to a MHP terminal device;
a local network interface configured to connect said network device to a local network, and for transmitting a local network transport stream to said MHP terminal device, local network MHP applications to be launched at said MHP terminal device are transmitted within said local network transport stream; and
a multiplexing device configured to multiplex said local network MHP application into said local network transport stream.

16. A network device, comprising:
a storage device configured to store local network MHP applications, or a device configured to generate such MHP applications, that are to be transmitted to a MHP terminal device;
a local network interface configured to connect said network device to a local network, and to transmit a local network transport stream to said MHP terminal device, wherein local network MHP applications providing user interface resources according to a MHP standard to be launched at said MHP terminal device are transmitted within said local network transport stream;
a broadcast interface configured to receive a broadcast transport stream, wherein broadcast MHP applications to be launched at said MHP terminal device are transmitted within said broadcast transport stream and are received via said broadcast interface, wherein said MHP broadcast applications are configured to be identified, loaded and launched within said MHP terminal device;
a multiplexing device configured to multiplex said local network MHP application into said local network transport stream; and
an object carousel generator configured to segment said local network MHP applications into a set of data packets, and to repeatedly transmit said set of data packets.

17. The network device according to claim 16, wherein said local network MHP applications use graphical user interface resources at said MHP terminal device for providing a graphical user interface that enables a user to interact with said local network MHP applications.

18. The network device according to claim 16, wherein said local network MHP applications are MHP applications for remotely accessing and/or controlling said network device from said MHP terminal device.

19. The network device according to claim 18, wherein remote access and remote control are effected by transmitting commands from said MHP terminal device via said local network to said network device.

20. The network device according to claim 16, wherein said network device is embedded in said MHP terminal device.

21. The network device according to claim 16, wherein said network device either is a NCAM, an AV content server, a transcoder, a DVB recorder, or a home automation server.

22. A method for controlling a network device that is connected to a local network by means of a MHP terminal device connected to the same local network, comprising:
transmitting a local network MHP application providing user interface resources according to the MHP standard together with a local network transport stream from said network device to said MHP terminal device;
launching said local network MHP application at said MHP terminal device;
transmitting a broadcast MHP application together with a broadcast transport stream to said MHP terminal device;
launching said broadcast MHP application at said MHP terminal device;
transmitting commands and/or messages via said local network to said network device in order to remotely access and/or control said network device; and
configuring an object carousel generator to segment said local network MHP applications into a set of data packets, and to repeatedly transmit said set of data packets.

23. The method according to claim 22, further comprising:
monitoring said local network transport stream for MHP applications transmitted within said local network transport stream.

24. The method according to claim 22, further comprising:
downloading local network MHP applications from said local network transport stream.

25. The method according to claim 22, further comprising:
passing a MHP application byte code received by said MHP terminal device to a MHP layer at said MHP terminal device, wherein an underlying protocol used on said local network is hidden from said MHP layer.

26. The method according to claim 22, further comprising:
providing a graphical user interface at said MHP terminal device that enables a user to interact with said local network MHP applications.

27. A network device including a computer readable storage medium having computer readable instructions stored thereon that when executed by a processor performs:
transmitting a local network MHP application providing user interface resources according to a MHP standard together with a local network transport stream from said network device to said MHP terminal device;
launching said local network MHP application at said MHP terminal device;
transmitting a broadcast MHP application together with a broadcast transport stream to said MHP terminal device;
launching said broadcast MHP application at said MHP terminal device;
transmitting commands and/or messages via said local network to said network device in order to remotely access and/or control said network device; and
configuring an object carousel generator to segment said local network MHP applications into a set of data packets, and to repeatedly transmit said set of data packets.

* * * * *